United States Patent [19]
Reed et al.

[11] 3,911,083
[45] Oct. 7, 1975

[54] NITROGEN OXIDE CONTROL USING STEAM-HYDROCARBON INJECTION

[75] Inventors: Robert D. Reed; Eugene C. McGill, both of Tulsa, Okla.

[73] Assignee: John Zink Company, Tulsa, Okla.

[22] Filed: Feb. 24, 1972

[21] Appl. No.: 228,823

[52] U.S. Cl. ............................................. 423/235
[51] Int. Cl. ........................................... B01d 53/34
[58] Field of Search ......................... 423/210, 235

[56] References Cited
UNITED STATES PATENTS
| | | | |
|---|---|---|---|
| 2,673,141 | 3/1954 | Barman | 423/210 |
| 3,232,713 | 2/1966 | Felder | 423/235 |

*Primary Examiner*—Earl C. Thomas

[57] ABSTRACT

This invention describes a furnace system for the reduction of nitrogen oxide containing gases which utilizes a two-chambered refractory lined furnace. Fuel gas and stoichiometric air is introduced into the first chamber to provide an ambient temperature sufficient for the reaction of steam and hydrocarbon gases which are introduced into the first chamber to provide a reducing atmosphere. The nitrogen oxide ($NO_x$) containing gases are also introduced into the first chamber where the $NO_x$ is reduced. The gases then pass into the second chamber where they are rapidly cooled to a temperature below that at which there is thermo-regeneration of nitrogen oxides. Additional air is supplied to the second chamber for the combustion of combustible gases remaining therein after reduction, care being taken that the temperature never rises above the temperature at which there is substantial regeneration of nitrogen oxides.

3 Claims, 1 Drawing Figure

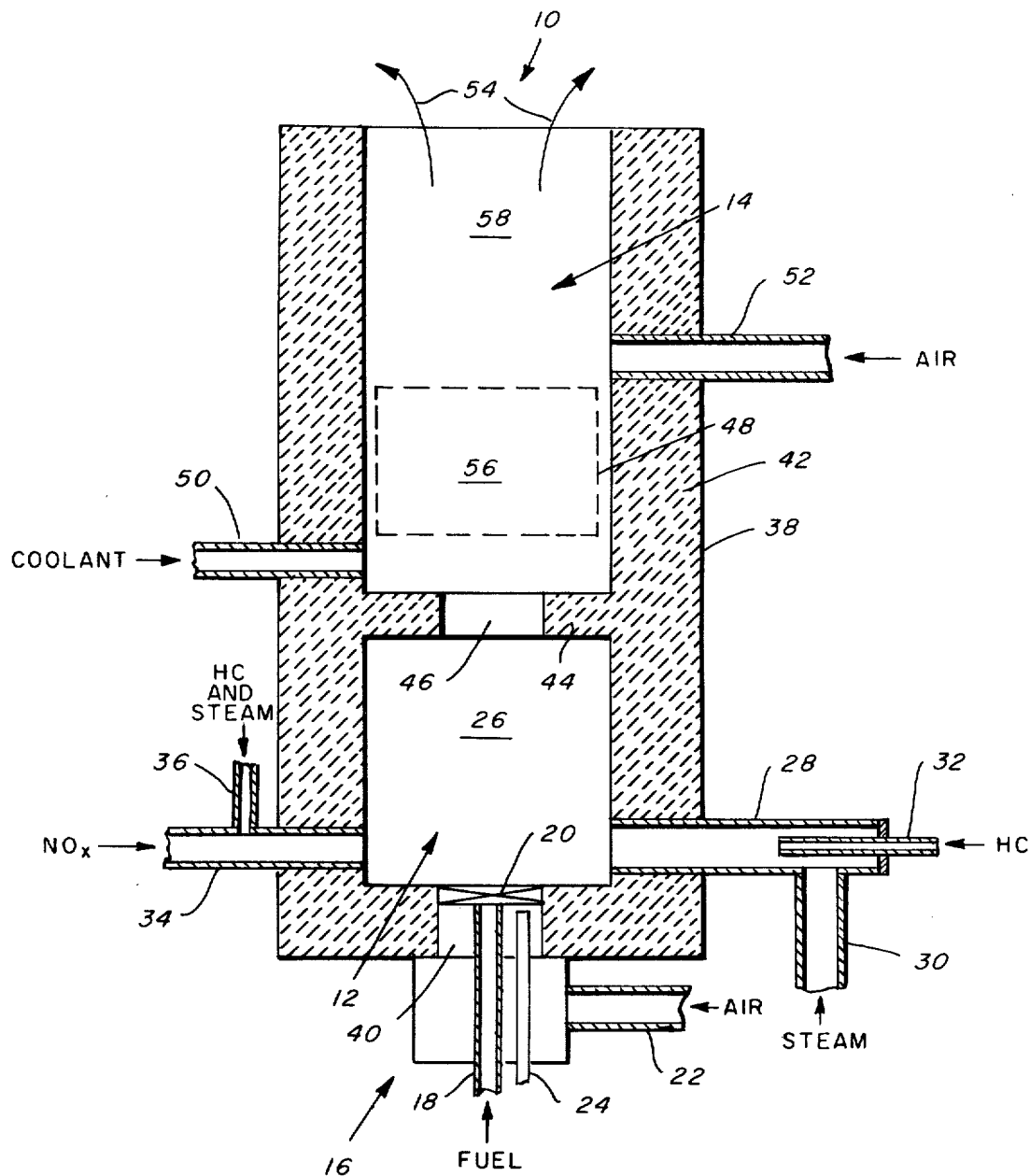

NITROGEN OXIDE CONTROL USING STEAM-HYDROCARBON INJECTION

BACKGROUND AND SUMMARY OF THE INVENTION

Because of the great interest in reducing the pollution of the atmosphere it becomes increasingly important that any nitrogen oxide gas which might result from chemical or refinery operation must be reduced to basic nitrogen before they are permitted to go into the atmosphere. There are a large number of nitrogen oxides, such as $N_2O$, $NO$, $NO_2$, $(NO)_2$, $N_2O_3$, $(NO_2)_2$, $N_2O_5$, etc. and referred to herein as $NO_x$. Several of these, such as $NO_2$, $(NO_2)_2$, and $N_2O_3$ help form a large part of the brownish haze which is seen in smog in the larger cities. Most nitrogen oxide gases can support combustion at suitable temperatures. However, it is necessary to have a reducing atmosphere before the nitrogen oxides are reacted to free the nitrogen.

The prior art devices have a serious shortcoming that is overcome in the present invention, in that all of them rely on a burner operation with less than stoichiometric air for generation of combustibles to reduce the nitrogen oxides.

It is more convenient to operate the burner or heat source at stoichiometric air supply for the fuel which creates a hot gaseous atmosphere, and then cause the atmosphere to be reducing through separate addition to it of a hydrocarbon-steam mixture, or $H_2$, $CO$, or hydrocarbon. The steam-hydrocarbon mixture is preferred because of typical reforming reaction as:

$$CH_4 + H_2O = CO + 3H_2$$

This reaction, which is endothermic, is caused to occur by heat available from the hot furnace atmosphere to cause the atmosphere to become reducing. It is also possible to cause the furnace atmosphere to become reducing through, again, separate introduction of an air-hydrocarbon mixture in which the hydrocarbon-air mixture contains less-than stoichiometric air for the hydrocarbon but enough air to prevent the presence of free carbon.

When the $NO_x$ are introduced into this region of reducing atmosphere the nitrogen is freed and the hydrogen and carbon monoxide are partially burned. With the nitrogen freed, the gases must be cooled below a temperature, above which, reoxidation of the nitrogen will occur. It is therefore necessary to move the gases from the first chamber into a second contiguous chamber where the temperature is dropped as rapidly as possible. This can be done by the introduction of cooling means, to reduce the temperature rapidly to below 2,000°F and preferably to about 1800°F. This is well above the auto-ignition temperature for hydrogen and carbon monoxide so they will automatically ignite and be burned before the gases issue into the atmosphere, and it is well below the temperature at which substantial amounts nitrogen will automatically oxidize.

BRIEF DESCRIPTION OF THE DRAWING

The drawing illustrates in schematic form a vertical axis, two-chambered burner suitable for the reduction of nitrogen oxide gases.

DESCRIPTION OF THE PREFERRED EMBODIMENT

It is a principal object of this invention to provide a simple and effective apparatus for the reduction of nitrogen oxides under conditions which do not require careful control of the state of fuel burning. It is a further object of this invention to provide a furnace for the reduction of nitrogen oxides in which the reducing atmosphere is provided by a mixture of steam and hydrocarbons and wherein, after reduction, the mixture of gases is rapidly cooled to a temperature where the nitrogen is prevented from recombining with oxygen.

These and other objects of this invention and a better understanding of the principles and details of the invention will be evident from the following description taken in conjunction with the appended drawing which indicates in schematic form a preferred embodiment of the furnace for reducing nitrogen oxides.

Referring now to the drawing, the numeral 10 indicates generally the combustion furnace. Numeral 12 indicates the first chamber of the furnace and numeral 14 the second chamber. Numeral 16 indicates generally the fuel and air supply to provide the proper temperature for the reduction operation. The burner system comprises a gaseous fuel line 18 and burner 20 with a plenum and air pipe 22 for supplying air for the combustion. The supply of air is controlled stoichiometrically so that there will not be excess oxygen in the first chamber 26. The purpose of the combustion of fuel 18 is to provide a suitable temperature within the first chamber so that a reducing atmosphere can be generated by introduction of a mixture of hydrocarbon and steam. This is accomplished through inlet pipe 28 wherein steam entering through line 30 and hydrocarbon through line 32 are mixed and injected into the heated zone in chamber 26.

Having provided in the chamber 26 the proper reducing atmosphere, which means an excess of hydrogen and CO, the nitrogen oxide containing gases are introduced into the chamber 26 through pipe 34. Alternatively, the mixture of hydrocarbon and steam can be introduced into the pipe 34 through the branch line 36 so that the nitrogen oxides, hydrocarbon and steam are all mixed prior to entry into the heated chamber 26. Alternatively, instead of utilizing steam and hydrocarbon to provide the reducing atmosphere, combustibles, such as hydrogen, carbon monoxide or methane can be introduced into the branch pipe 36 and mixed with the nitrogen oxides in pipe 34 to provide the reduction zone needed to reduce the nitrogen oxides.

After a sufficient residence time in the chamber 26 in the reduction zone the gases, including the nitrogen now free of its oxygen, pass through opening 46 in the area wall 44 into the second chamber 14. Here the gases are rapidly cooled, by means of a coolant entering through line 50, to a temperature in the range of 1,250°F to 2,000°F. This cooling should be as rapid as possible and conveniently can be accomplished by any cooling medium introduced in a turbulent manner so that it quickly contacts, cools and dilutes the gases issuing from the first chamber 26. The dashed line 48 indicates this zone of quenching which is required to keep the temperature so low that the nitrogen will not recombine with oxygen.

However, there are now excess combustibles, mainly hydrogen and CO which must be removed from the gas outflow 54 by burning with air which can be conveniently introduced through line 52. On the other hand, if cool air is used as the coolant it will also provide oxygen for combustion of the remaining combustibles. Since heat will be provided by the combustion of the hydrogen and carbon monoxide the cooling in zone 56 must be such that even with this heating the effluent gases, shown by arrows 54, will still be below the temperature of 2,000° at which nitrogen will recombine with oxygen. The effluent gases now contain an excess of air plus water, carbon dioxide, and nitrogen.

While the invention has been described with a certain degree of particularity it is manifest that many changes may be made in the details of construction and the arrangement of components. It is understood that the invention is not to be limited to the specific embodiment set forth herein by way of exemplifying the invention, but the invention is to be limited only by the scope of the attached claim or claims, including the full range of equivalency to which each element or step thereof is entitled.

What is claimed is:

1. A method to diminish $NO_x$ in burning gases comprising the steps of:

burning a fuel with a substantially stoichiometric amount of combustion supporting gas or air in a first refractory lined chamber;

introducing gases containing said $NO_x$ into said first chamber;

introducing a mixture of hydrocarbon gas and steam into said first chamber to provide therein a reducing atmosphere;

passing the resulting gas effluent at temperatures above 2000°F into a second refractory lined chamber;

rapidly cooling and maintaining said resulting effluent to a temperature within the range of 1250°to 2000°F; and introducing air into said second chamber to burn excess combustibles.

2. The method as in claim 1 in which said first gases comprise a mixture of hydrocarbon gas and steam which are reformed into $H_2$, CO and $CO_2$.

3. The method as in claim 1 in which said first gases comprise at least one gas from the group of $H_2$, CO and $CH_4$.

* * * * *